United States Patent [19]

McVeigh et al.

[11] Patent Number: 5,720,012

[45] Date of Patent: Feb. 17, 1998

[54] SECURITY MODULE FOR A PRINTING APPARATUS

[75] Inventors: Michael J. McVeigh, Webster; Jose R. Diaz, Rochester; Paul W. Eakin, Webster; Lawrence Meyer, Fairport; George E. Marshall, Fairport, all of N.Y.

[73] Assignee: Xerox Corporation, Stamford, Conn.

[21] Appl. No.: 791,009

[22] Filed: Jan. 27, 1997

Related U.S. Application Data

[63] Continuation of Ser. No. 371,909, Jan. 12, 1995, abandoned.

[51] Int. Cl.$^6$ .................................................. G06K 15/00
[52] U.S. Cl. ........................... 395/113; 395/117; 395/114
[58] Field of Search ........................... 395/113, 117, 395/112, 114, 101, 109, 201, 216, 218, 233, 186, 188.01, 245; 358/437, 406, 405, 434, 468; 364/478.01; 235/375, 379, 3, 380; 347/19, 142; 400/76, 676; 380/55; 326/8; 283/58, 59

[56] References Cited

U.S. PATENT DOCUMENTS

| 4,264,808 | 4/1981 | Owens et al. | 235/379 |
|---|---|---|---|
| 4,672,377 | 6/1987 | Murphy et al. | 235/375 |
| 4,939,674 | 7/1990 | Price et al. | 395/109 |
| 4,980,719 | 12/1990 | Allen et al. | 355/201 |
| 5,053,607 | 10/1991 | Carlson et al. | 235/379 |
| 5,075,875 | 12/1991 | Love et al. | 395/117 |
| 5,274,567 | 12/1993 | Kallin et al. | 364/478 |
| 5,341,290 | 8/1994 | Lu | 395/244 |
| 5,427,459 | 6/1995 | Makino | 395/112 |

FOREIGN PATENT DOCUMENTS 42 01 967 A1 7/1993 Germany.

Primary Examiner—Edward L. Coles, Sr.
Assistant Examiner—Dov Popovici
Attorney, Agent, or Firm—R. Hutter

[57] ABSTRACT

A security module is operatively disposed at the hardware/software interface within a printing apparatus. The module is disposed along a connection which acts as a medium for command signals to operate the printer hardware, and for status signals to indicate physical conditions within the hardware. The security module facilitates security procedures which control aspects of printer operation, particularly the creation of MICR characters.

18 Claims, 3 Drawing Sheets

SECURITY MODULE FOR A PRINTING APPARATUS

This application is a continuation of application Ser. No. 08/371,909, filed Jan. 12, 1995, now abandoned.

The present invention relates to a security module which can be incorporated within a printing apparatus, particularly as to control the production of magnetic-ink-character-recognition (MICR) documents such as checks.

Printing apparatus for rendering images on paper in response to digital data from a computer, such as electrophotographic "laser" printers and ink-jet printers, are familiar in many offices. Recently, the technology which is used in such printers has been found to be applicable to the creation of documents having magnetic-ink, or MICR, characters therein. These MICR characters are familiar as the characters which appear at the bottom of checks. MICR characters are typically numerical characters which are rendered in an ink having magnetic material therein, so that when the characters are run across a magnetic read head, the changing magnetic flux on the readhead caused by unique individual MICR characters create identifiable magnetic flux patterns in the read head. Each individual character (such as the numbers 0-9) has a unique magnetic flux pattern associated therewith, so that the characters can be rapidly read through the read head in an automated check-sorting process. In the United States, the font used for such MICR characters is known as "E13B," although another font having the same function, known as "CMC7," is used in other countries.

Because MICR characters (defined as characters formed on a substrate with a magnetic material, with a font readable by a standard read head) are often used to create documents of value such as checks, security measures must be provided to prevent unauthorized creation of fraudulent documents. In the context of digital printing, such as electrophotographic or ink-jet printing, security measures for preventing unauthorized creation of MICR documents can follow one or more of three strategies: security procedures may be required for (a) access to the printing apparatus in general; (b) access to the magnetic- or metallic-based printing material, such as toner or liquid ink; or (c) access to the software by which MICR characters are created. The reason that alternatives (b) or (c) may be preferable to (a) is that, particularly for a large-scale work-group printing apparatus, the apparatus in general may be desired to be used by a large number of networked users for general purposes such as printing letters. In such a case, security procedures may be required only when MICR documents are created, with the apparatus being generally free for printing other documents. It is a possible design option that a large-scale printing apparatus may provide a plurality of marking devices, such as xerographic development units or ink-jet ink supplies, only one of which includes the magnetic-based marking material for MICR characters. What is meant by "security procedures" is any provision for restricting access, such as the entering of a password by one or more persons, the insertion or sweeping of an authorization card, or even a physical locking of hardware, such as with a lock and key.

In providing a security system for a printing apparatus capable of producing MICR documents, a highly desirable feature is that the security system can be "retrofitted" in an existing printer design, or even in a pre-existing individual printing apparatus. In this way, a security system could be provided as a simple option to a type of printing apparatus with which the customer is already familiar, or a security system could be designed for use with a printing apparatus manufactured by another vendor.

In the prior art, U.S. Pat. No. 264,808 discloses a system for separating the information on documents involved in accounting or banking transactions and for placing control of the processing of the transaction on the separated information, instead of on the documents themselves. An "image lift unit" generates an electronic image of each of a series of documents and also tags the documents with identification indicia to provide entry records which can be processed by a computer.

U.S. Pat. No. 4,980,719 discloses a reproduction system for confidential documents which include image portions formed with magnetic or metallic toners. The reproduction apparatus is capable of reproducing a visible image with non-metallic pigment corresponding to one portion of the desired image and using metallic or magnetic pigment in a second portion of the image.

U.S. Pat. No. 5,075,875 discloses a control system for a digital printer, which is coupled between the host computer and the raster image processor of the printer. Bidirectional communication exists among the host, the printer, and the microprocessor on which the control system is operative. The system includes an audit trail feature which enables the printer to maintain a record of generating negotiable instruments such as checks.

According to one aspect of the present invention, there is provided a printing apparatus comprising an image output terminal for rendering an image on a surface according to imagewise digital data. The image output terminal includes a command receiving element for operating a mechanical element of the image output terminal in response to a command signal, and a status element for producing a status signal in response to a condition within the marking engine. An electronic subsystem is adapted to output imagewise digital data and a command signal to the image output terminal, and to receive a status signal from the status element. A connection between the image output terminal and the electronic subsystem acts as a medium for passage of command signals and status signals therethrough. A security module, having a security algorithm associated therewith, is operatively interposed along the connection between the image output terminal and the electronic subsystem. The security module receives a command signal, processes the command signal according to the security algorithm, and selectably outputs an altered command signal to the image output terminal.

According to another aspect of the present invention, there is provided a security module for a printing apparatus. A logic unit appliers a security algorithm to a command signal from an electronic subsystem which outputs imagewise digital data and a command signal to an image output terminal for causing the image output terminal to render a desired image on a surface according to the digital data. The logic unit outputs an altered command signal to the image output terminal in response to the security algorithm.

Figure 1:
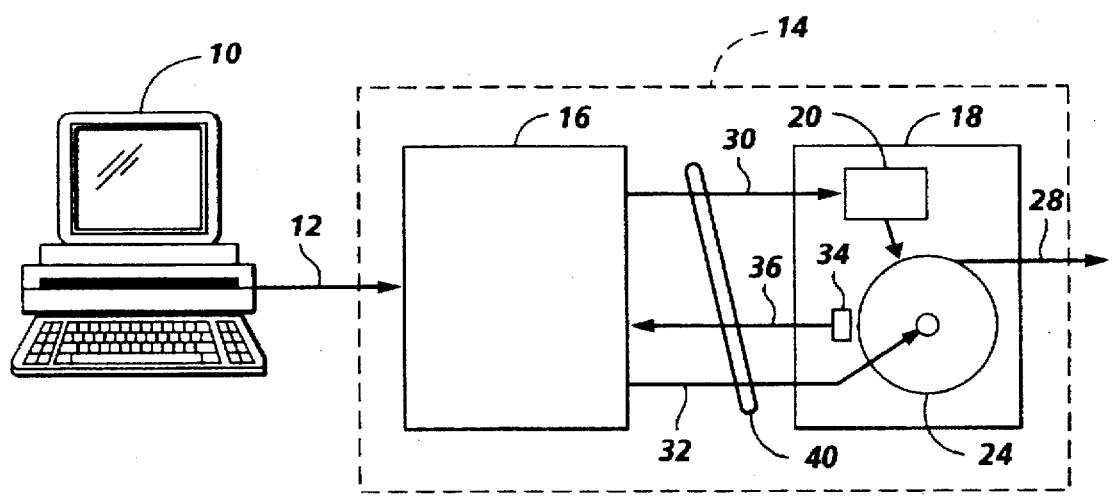
FIG. 1 is a systems diagram showing essential elements of a printing apparatus known in the prior art.

FIG. 1 is a diagram showing the essential elements of a printing apparatus according to the familiar "personal computer" model known in the prior art. According to this model, a host computer 10, such as a familiar personal computer, is connected by a bus 12 to a printer generally indicated as 14. It is to be understood that the bus 12 could be in the form of a network, and that a number of host computers 10 may selectably address the printer 14 through bus 12 by means such as the "Ethernet" protocol.

As illustrated in FIG. 1, printer 14 is conceptually divided into two portions, an electronic subsystem (ESS) indicated as 16 and an image output terminal (IOT) indicated as 18. This division of a printing apparatus is in fact fairly common in the design of digital printers.

Turning first to the image output terminal, IOT 18 is intended to encompass all of the electro-mechanical hardware which is directly relevant to creating marks on a sheet according to imagewise digital data. Such hardware is typically related to either a electrostatographic or ink-jet printing technique. As such, IOT 18 is further divided in FIG. 1 into distinct portions, such as imager 20 and transport 24. These general terms can be applied to many types of printing techniques. For example, if printer 14 is a xerographic "laser" printer, imager 20 would typically comprise a raster output scanner (ROS) laser, which outputs a scanning beam which is modulated according to digital data, while the transport 24 includes a photoreceptor having a charged surface, which moves past the imager 20 so that the laser can selectably discharge desired areas to form an electrostatic latent image which is subsequently developed with toner and transferred onto a print sheet (by means not shown). If printer 14 is of the ink-jet type, imager 20 may be in the form of a ink-jet printhead, and transport 24 may be in the form of a paper transport which causes the print sheet to move past the ink-jet printhead may selectably deposit liquid ink in desired areas on the sheet to form the image. What is important is that imager 20 accepts digital video data directly representative of the image desired to be printed, while transport 24 is a mechanical element which enables the imager 20 to create the desired image on a sheet which is output on the printer, such as through path 28.

Electronic subsystem or ESS 16 represents the portion of the printer 14 which directly controls the hardware in IOT 18. As can be seen in FIG. 1, there exists a video line 30 from ESS 16 to imager 20 of IOT 18. Video line 30, which may be in the form of a serial cable or parallel bus, applies digital data to the imager 20 so that the imager may modulate a laser beam in a raster output scanner or selectably activate individual ejectors in an ink-jet printhead. There is also at least one (and typically more) command line 32, along which ESS 16 outputs any number of command signals to particular mechanical elements in IOT 18. A "command signal" should be understood as a signal which is directly operable on a mechanical element, such as a motor or a relay, within the IOT 18. The mechanical element, therefore, can be seen as a "command receiving element," because the mechanical element performs a function (e.g., a motor starts rotating, or a fuser warms up) in response to a command signal from the ESS 16.

As command signals go from ESS 16 to a command receiving element such as 24 in IOT 18, IOT 18 can output status signals to ESS 16. FIG. 1 shows an example detector 34 which outputs a status signal along status line 36 back into ESS 16. One common function of a detector such as 34 is to determine, such as by a mechanical trip switch or a photodetector, whether a print sheet is properly positioned within the IOT 18 at the beginning of a print cycle. Of course, if no print sheet is properly fed in the IOT 18 at the beginning of a print cycle, there will be no sheet on which to form the image; if sheets are improperly fed, the IOT 18 will jam and the desired image will not be successfully printed. These are two examples of many possible conditions which can be detected by one or more detectors in a manner which is familiar to those of skill in the art. For present purposes, what is important is that a detector 34 having a particular purpose related to a physical condition within IOT 18 (e.g., a sheet is not available in a particular position, more than one sheet has been fed onto the transport) is capable of outputting a status signal 36 to the ESS 16, the status signal 36 having a predetermined meaning relevant to the operation of IOT 18. For example, detector 34 could output a digital 1 when a particular mechanical sequence has been successfully performed in the IOT 18, or could output the digital 1 status signal if a malfunction is detected; the actual configuration and meanings of any particular status signal will depend on the specific design of the IOT.

In addition to controlling the mechanical elements of IOT 18 through command line 32 and receiving status signals through status line 36, a key familiar function of ESS 16 is to receive from host 10 a stream of information relevant to the desired image to be printed. Typically, a "page description language" technique is used. Under this familiar technique, host 10 outputs a set of characters in ASCII or similar format, along with instructions to the ESS 16 to render these characters in a particular font. The desired font is in the form of bitmaps which are sent along video line 30 to imager 20 for creating each individual character as required. These bit maps are typically stored at ESS 16, although it is also possible that ESS 16 could accept the bitmaps for an unusual font from another computer as required. This is the general technique carried out by page description languages such as HP-PCL or PostScript.

The video line 30, command line 32, and status line 36 shown in FIG. 1 are collectively indicated as a "connection" 40, which acts as a medium for passage of command signals and status signals therethrough. In a physical manifestation of a printer such as 14, the various connection between the ESS 16 and the IOT 18 are formed on a single cable harness which provides the interconnect at the ESS/IOT interface. In one common hardware design, such a connection is in the form of a 26-pin plug and socket arrangement which forms this connection. The twenty-six pins are variously assigned different functions, according to a particular printer design, and many of the pins may not be used, but some typical arrangements of these pins and the cable harness forming connection 40 include two lines for the video data (generally corresponding to video line 30), two lines for "line synchronization;" two lines for "start of scan synchronization;" and one line for "page synchronization." All of these parameters are relevant to proper operation of a raster output scanner in an electrophotographic printer, and their functions will be apparent to one of skill in the art. Typically two further pins are provided for the output of status signals and two pins are set aside for command signals. Whatever the specific meaning of "status" and "command" signals in any particular printer design from a particular vendor, these definitions of status and command signals as required to describe the present invention are defined in the specification and claims herein.

As mentioned above, if a printer such as 14 is used for the creation of MICR characters (that is, characters formed with a magnetic or metallic-based material using particular MICR fonts), it will be desirable to provide a security system to restrict access either to the printer 14 as a whole, or else to one or both of the magnetic marking material, or the special MICR fonts. According to the present invention, there is proposed a security module, capable of requiring various security procedures, which function at the interface indicated as connection 40 in FIG. 1. That is, the security module of the present invention operates at the software/hardware interface within the printer 14.

Figure 2:
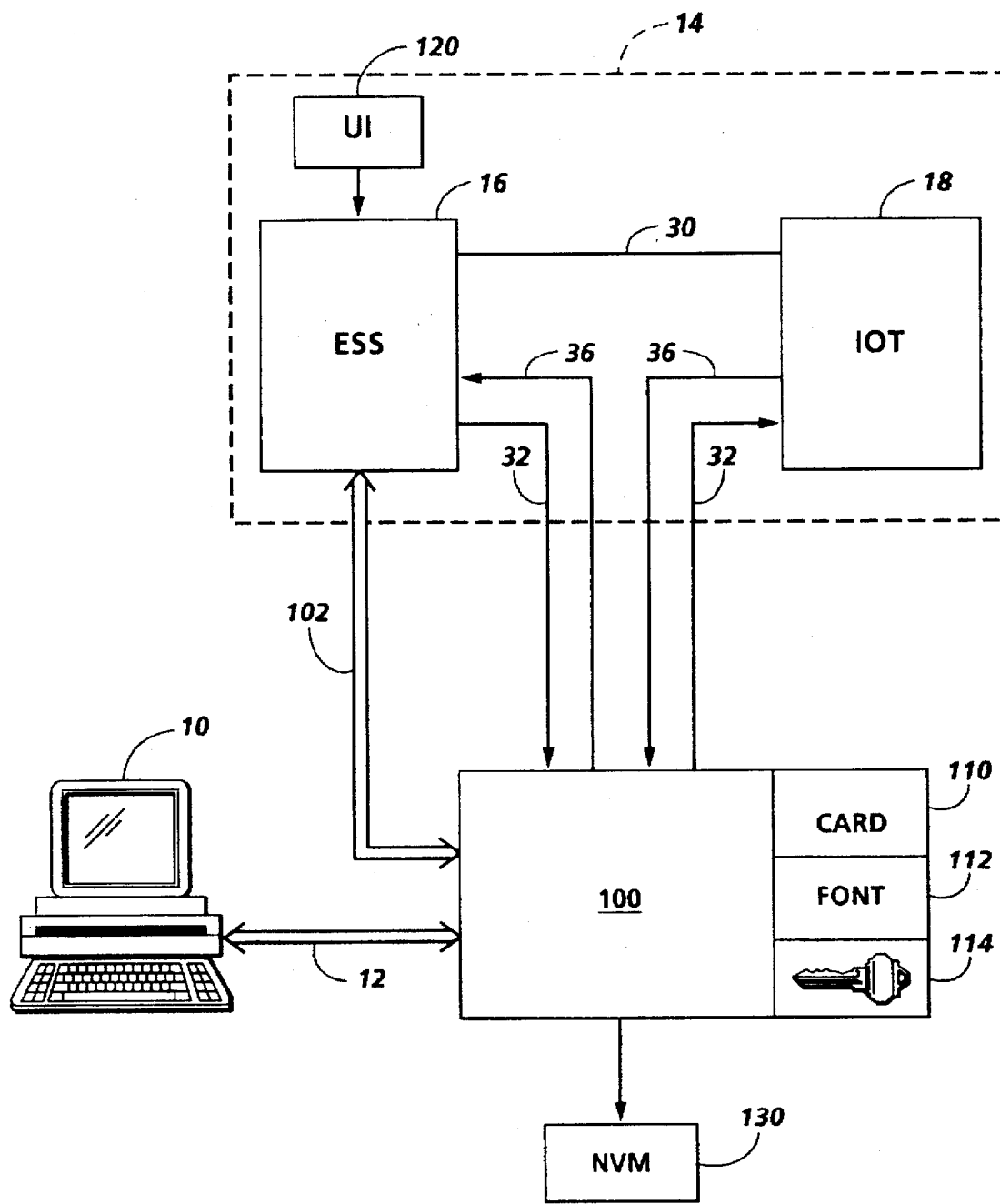
FIG. 2 is a systems diagram showing a printing apparatus in operation with a security module according to one aspect of the present invention.

FIG. 2 is a system diagram showing the operation of a security module 100 according to the present invention as it interacts with the ESS 16 and IOT 18 of printer 14, as well as with the host computer 10. The function of security module 100 is to accept the usual input of characters and other information from computer 10, and in general most of such information is directly passed through ESS 16, such as through a bus or other connection 102 where the information is processed by the ESS 16 for printing as though the security module 100 were not there.

According to the preferred embodiment of the invention, only certain information from host 10, specifically that information relating to MICR characters (either because the characters are intended to be printed with magnetic material, or are intended to use a MICR font), security module 100 causes such information to be processed according to a "security algorithm." As used in the specification and claims herein, a security algorithm is a program or portion of a program in which a user is required to enter a security procedure in order to perform a particular function which is requested of the printer 14. Such a "security procedure" may include, for example, the entry by one or more persons of unique passwords; the insertion or sweeping of a magnetically-encoded card; or the turning of a key-operated switch. Alternately, an arrangement may be provided which combines various security procedures, such as providing an external box in which a key must be used to access a slot for the encoded card. These security procedures may be required by the security algorithm to permit a particular user to either access printer 14 in general; access a particular source of magnetic printing material (such as a development unit or liquid ink supply) within the IOT 18; or to use the ESS 16 to create MICR fonts such as E13B or CMC7.

FIG. 2 shows how security module 100 of the present invention is arranged along the connection between ESS 16 and IOT 18 in such a manner that security module 100 is operatively interposed along both command line 32 and status line 36. In this manner, command signals from ESS 16 intended for IOT 18 will be subject to the functions of the security algorithm within security module 100, and similarly certain status signals 36 from IOT 18 intended for ESS 16 may be subject to alteration by security module 100.

According to the present invention, when any particular status signal or command signal which may be relevant to a security function passes along the connection and also through security module 100, security module 100 will process the signal according to the security algorithm and if necessary alter the signal before it reaches its destination within printer 14. By "altering" a signal, it is meant that security module 100 may output a different signal in place of the received signal, or may select to simply not transmit the signal, or send a signal to someplace besides the place where the original signal was intended to go; that is, the "altered signal" may in fact be no signal. The application of the security algorithm, and the selectable output of an altered command or status signal in reponse to the security algorithm being applied to an original command or status signal, is carried out by a "logic unit" (not shown) within security module 100. Such a logic unit may be embodied by, for example, a suitably-programmed microprocessor operatively connected to command lines 32 and status lines 36.

To take concrete examples of this principle of the security module, consider a basic case where host 10 instructs the printer 14 to print certain characters with the E13B MICR font, in a document having characters of various other fonts as well. Information relating to the other fonts will be simply passed through along bus 102 for use by the ESS, and are never touched by security module 100. Optionally, the ASCII characters intended to be printed in the MICR font can be passed along to the ESS 16 as well without alteration. The information from host 10 which of interest to security module 100 would be the instruction to print certain characters with the E13B font. In order to print such characters, security authorization will be needed. It is the purpose of the security algorithm within security module 100, upon noting this important font instruction, to check, through software means which would be familiar to one of skill in the art, to see whether the particular requester at host 10 is authorized. As mentioned above, this authorization can come from the entering of a suitable password by the user on host 10 (and also optionally, another password issued by a systems administrator at another host or at a panel on the security module 100 itself), or the insertion or sweeping of a magnetically readable card at the security module 100. This card entry is shown generally as 110 as a portion of security module 100.

Whether or not the proper authorization is manifest in one of the security procedures will effect the behavior of signals passing through 100. In one simple case, it will inevitably be required that a command signal eventually come from ESS 16 through line 32 into IOT 18 in order to start the printing process. If the security algorithm in the security module does not receive the necessary security procedure, security module 100 can function to prevent any use of the IOT 18 by altering the signal from ESS 16 that starts the transport, by outputting no signal where the start signal would have been. This would be the most obvious method of preventing printing of an unauthorized MICR document. However, depending on the particular design of the IOT 18, a different alteration of the command signal can be made. For example, if the IOT 18 has two available sources of marking material, one magnetic and one non-magnetic, such as two development units or two liquid ink supplies, the altered signals on command line 32 could alter the request to use the magnetic marking material and substitute therefore a request to use the non-magnetic marking material, such as by activating one development unit instead of the other. In this way, the IOT 18 will output the desired image, except not with the magnetic material necessary for MICR characters.

Security module 100 can also be used to respond to status signals on status line 36, where such status signals are relevant to security considerations. For example, it is a common design in work group printing apparatus that if there is a misfeed or paper jam within the IOT 18, the IOT 18 will be controlled by the ESS 16 to simply print out the misfed image once again on a subsequent sheet. However, if a series of checks are being produced, this fairly common recovery technique could result in the production of two checks where only one was intended. Thus, a paper jam or misfeed detected by a detector 34 in IOT 18 could present a security problem. So, when a detector such as 34 outputs a particular misfeed or paper jam status signal on status line 36, security module 100 outputs back onto line 36 an altered signal, such as a signal to override the programming in ESS 16 that would cause a reprint, and also may output either on status line 36 or through bus 102, an instruction to display some sort of error message at a graphical user interface responsive to the ESS, such as shown here by 120. This error message, which may read something like "Paper misfeed at printer, check number 101 not printed" may also be communicated through connection 12 to host 10 as needed. In this way, security module 100, which is operatively disposed along command signal line 32 and status signal line 36, can be made sensitive to any behavior of the ESS or IOT which may have a security implication.

According to a preferred embodiment of the invention, the "secure" font for printing MICR characters, such as the E13B font or the CMC7 font, is preferably resident directly on security module 100, and is not immediately accessible to ESS 16 as would other fonts such as Roman. Such a "font card" is shown in FIG. 2 as 112. Under this arrangement, when host 10 presents a request to printer 14 to print in a MICR font, ESS 16 must request and access the font card 112 through security module 100. Ordinarily, for other fonts, the bitmaps for the fonts are resident within ESS 16, and typically placed in a hard or non-volatile form such as in a read-only memory. When the MICR font is accessed through security module 100, assuming that the necessary security algorithms have been satisfied, the bitmaps for the font are entered through bus 102 into ESS 16, but placed in ESS 16 in a non-permanent form such as in a volatile memory. The MICR fonts can then be used by ESS 16 as though they were resident fonts, but, significantly, these bit maps are erased or otherwise made inaccessible when certain predetermined external events occur to ESS 16. For example, security module 100 or ESS 16 could be programmed to erase the bitmaps in response to a power shut off, the printing of a certain number of prints, or the end of a job. Further, it is conceivable that either security module 100 or ESS 16 could include means by which a running total of all check amounts printed by a particular user could be compiled over time and compared to an available account kept elsewhere in the system. The important function is that access to the font card 112 is only temporary and can be revoked as part of the security algorithm in security module 100.

Another security aspect of font card 112 may be that the font card can in fact be placed on a physically removable card, such as a PCMCIA card, which can be selectably inserted and removed from the security module 100 to further prevent unauthorized access to the font. In order to access the font card, a particular user may have to physically obtain the card 112 from an authorized person. Further, there may be provided on the security module 100 a key mechanism such as shown as 114, which may operate to selectably shut any opening in which the font card 112 is to be inserted. The font card 112 may include, in addition to the MICR character font bitmaps, other security-sensitive bitmaps, such as a corporate logo.

Another feature of practical importance to security module 100 is the availability of a memory for keeping records of all MICR documents made by the printer 14. Such an "audit trail" memory is illustrated in FIG. 2 by non-volatile memory (NVM) 130. Such a "memory" could include, for example, an instantaneous hardcopy printing of a record of prints made. Under this system, when a MICR document invoking the security algorithm is printed, certain character strings, such as would be found in a check, are simultaneously copied into the non-volitile memory 130. Such character strings may include the payee, and the amount. Also, there may be included either at the security module 100 or at the audit trail memory 130, other provisions which are tied to the particular image data, such as the time of printing, and the identity of the last person to invoke the security algorithm. This copying of relevant character strings may be carried out by the same "logic unit," such as a microprocessor, which outputs altered status and command signals in reponse to a security algorithm.

As shown in FIG. 2, security module 100 is operatively disposed along the command signal line 32 and the status signal line 36, but does not necessarily interact with video line 30, by which the ESS 16 directly sends digital image data to the imager 20 in IOT 18. This is the preferred embodiment of the present invention, although an architecture in which the video line 30 is also subject to the security algorithm within security module 100 is possible. However, it has been found that merely controlling the command and status lines between the ESS 16 and IOT 18 is satisfactory for performing any common security procedure. One possible security feature which directly involves the digital signals along line 30 would be a possible design in which, should the MICR font bit maps in font card 112 be unavailable, to have security module 100 load into ESS 16 through bus 102 certain default characters instead of the desired MICR characters. These default characters, which may be simple Roman characters or special blank or other characters, would manifest themselves on the digital data on video line 30.

The physical presence of security module 100 along a command line 32 and a status line 36 may be relatively simply made, because in many common designs of printers, as mentioned above, these lines are part of a wire harness having plugs and sockets between ESS 16 and IOT 18. A hardware device which could re-route lines such as 36 and 32 as shown in FIG. 2 could simply be provided by a plug and socket combination adapted to be interposed between a plug and a socket between an ESS 16 and IOT 18 of a pre-existing printing apparatus. Therefore, a printing module such as 100 is relatively easily "retrofitted" in existing designs of printers, or even in printers which have already been installed.

It is significant that the security module 100 of the present invention carries out its security function within the printer 14, and particularly along the software/hardware interface within the printer 14 itself. This configuration represents a significant improvement over a system such as in U.S. Pat. No. 5,075,875, which carries out security and audit trail procedures at a microprocessor which is operatively disposed between the host and the printer. Because the security module of the present invention operates between the control software and the hardware within the printer itself, its function will be less intrusive to individual users at various hosts, particularly when there are a multiplicity of possible hosts distributed among a network. Further, because the security module 100 of the present invention directly receives status information at the hardware level from status line 36 (such as to individual paper feed and position detectors with an IOT 18), specific physical conditions within the printer, which may have security considerations, can be readily identified, and only those conditions which have security considerations would be allowed to halt the process. A system which resides between the host and the printer as a whole is less likely to be able to react properly to hardware faults within the printer. Because the security module of the present invention exists at a software/hardware interface, the security module may be relatively difficult to circumvent by a hacker who may conceivably be able to get around a security system which is external to the printer and therefore, may be considered to be as much "on the network" as any other host computer.

Figure 3A:
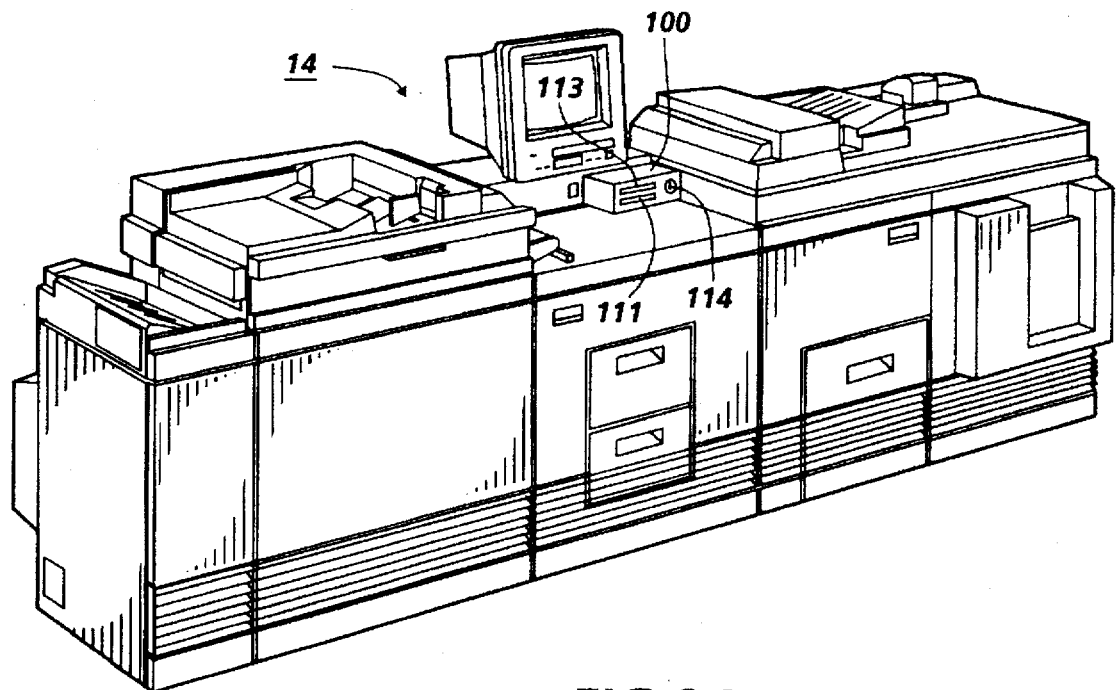
FIGS. 3A and 3B are perspective views of two possible physical configurations of the security module according to the present invention.
Figure 3B:
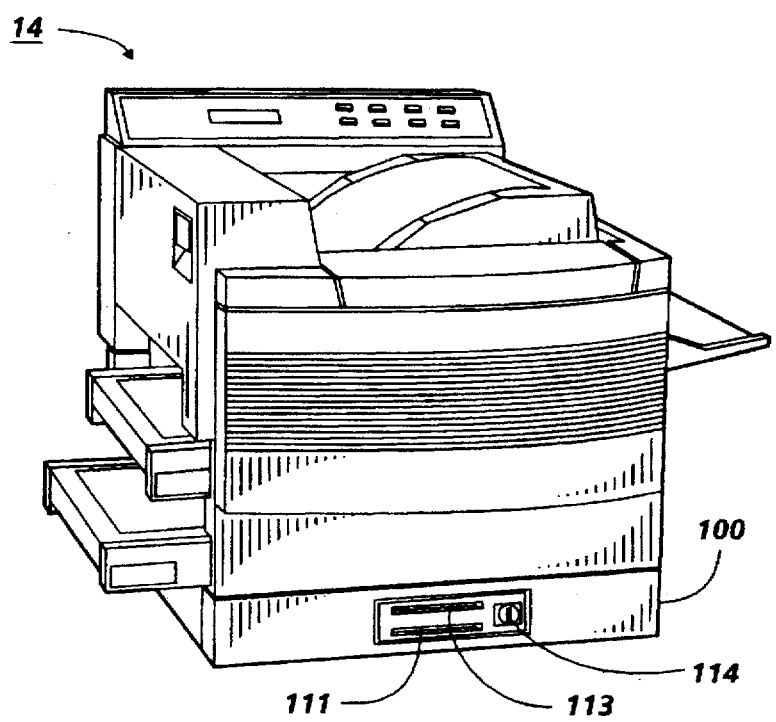

FIGS. 3A and 3B are simplified perspective views showing possible physical configurations of a security module 100 in combination with a pre-existing printing apparatus, each type shown as 14 respectively in the Figures. In FIG. 3A, the security module 100 is placed in a box which is intended to rest on or next to the printer itself, and in the FIG. 3B embodiment, the security module 100 is configured to be placed under a desk-top printer. In both cases, the important user-accessible portions of the module are a card slot 111, which will accept a magnetically-encoded card, a font card slot 113, which will accept a font card such as a PCMCIA card, and a physical key lock 114. Once again, the physical key lock 114 could be used either to enable the entire security module and thereby the entire printer, or conceivably could be used to restrict access to the font card slot 113 into which a font card can be inserted.

While the invention has been described with reference to the structure disclosed, it is not confined to the details set forth, but is intended to cover such modifications or changes as may come within the scope of the following claims.

We claim:

1. A printing apparatus comprising:
    an image output terminal for rendering an image on a surface according to imagewise digital data, including at least one command receiving element for operating a mechanical element of the image output terminal in response to a command signal, and a status element for producing a status signal in response to a condition within the image output terminal;
    an electronic subsystem, adapted to output imagewise digital data as video signals and a command signal to the image output terminal, and to receive a status signal from the status element;
    a connection between the image output terminal and the electronic subsystem, the connection acting as a medium for passage of video signals, command signals and status signals therethrough, the connection including at least a video line for transmission of video signals, a status line for transmission of status signals, and a command line for transmission of command signals; and
    a security module, having a security algorithm associated therewith, operatively interposed along the command line and the status line between the image output terminal and the electronic subsystem, the security module adapted to receive a command signal through the command line, process the command signal according to the security algorithm, and selectably output an altered command signal to the image output terminal through the command line, the security module being further adapted to receive a status signal through the status line from the status element associated with the image output terminal, process the status signal according to the security algorithm, and selectably output an altered status signal to the electronic subsystem through the status line, the security module being independent of the video line and not altering the video signals.

2. The apparatus of claim 1, the image output terminal further comprising a user interface.

3. The apparatus of claim 2, the security module being further adapted to selectably output an altered status signal, the altered status signal causing a predetermined output on the user interface.

4. The apparatus of claim 1, the electronic subsystem further including a font generator for outputting character bitmaps in the digital data, the character bitmaps being derived from a character set.

5. The apparatus of claim 4, the security module further including
    a secure character set resident therein, the secure character set being transferable to the font generator, and
    means for transferring the secure character set to the font generator in response to a security procedure.

6. The apparatus of claim 5, the security module further including a selectably removable font card, the secure character set being resident on the font card.

7. The apparatus of claim 6, the security algorithm in the security module including means requiring a security procedure for connecting the font card to the security module.

8. The apparatus of claim 6, the security algorithm in the security module including means requiring a security procedure for removing the font card from the security module.

9. The apparatus of claim 6, the security module further including a key lock for controlling connection of the font card to the security module.

10. The apparatus of claim 5, the electronic subsystem further including
    a memory for storing the secure character set, and
    means for causing the stored secure character set to become unavailable in response to an external event.

11. The apparatus of claim 1, the security algorithm in the security module including means requiring a security procedure for causing the security module to output commands to the image output terminal to render an image on a surface.

12. The apparatus of claim 1, the image output terminal including means for rendering MICR characters on a surface, and
    the security algorithm in the security module including means requiring a security procedure for causing the security module to output commands to the image output terminal to render MICR characters on a surface.

13. The apparatus of claim 1, the security module further including
    means for receiving image information from a host computer,
    means for transferring the image information to the electronic subsystem,
    an audit memory, and
    means for copying a portion of the image information to the audit memory.

14. The apparatus of claim 13, the security module further including means for entering into the audit memory a time check when image information is copied to the audit memory.

15. The apparatus of claim 13, the security module further including means for entering into the audit memory information relating to a most recent security procedure when image information is copied to the audit memory.

16. A security module for a printing apparatus, the printing apparatus including an electronic subsystem and an image output terminal, the electronic subsystem adapted to output imagewise digital data and output a command signal to the image output terminal for causing the image output terminal to render a desired image on a surface according to the digital data, the security module adapted to be interposed along a connection within the printing apparatus between the electronic subsystem and the image output terminal, the connecting including a video line for transmission of video signals, a status line for transmission of status signals, and a command line for transmission of command signals associated therewith, comprising:
    a logic unit, adapted to apply a security algorithm to a command signal received on the command line from the electronic subsystem, and apply a security algorithm to a status signal received on the status line from the image output terminal; and
    the logic unit further adapted to output an altered command signal on the command line to the image output terminal in response to the security algorithm, output an altered status signal on the status line to the electronic subsystem in response to the security algorithm, and not alter the video signals on the video line.

17. The module of claim 16, further comprising a secure character set resident therein, the secure character set being transferable to a font generator in the electronic subsystem for outputting character bitmaps in the digital data, and the logic unit further adapted to transfer the secure character set to the font generator in response to a security procedure associated with the security algorithm.

18. The module of claim 16, further comprising an audit memory, and the logic unit further adapted to copy a portion of image information from a host computer to the audit memory.

* * * * *